United States Patent [19]

Queveau

[11] Patent Number: 4,518,053
[45] Date of Patent: May 21, 1985

[54] ARTICULATED VEHICLE DRIVE AND CONTROL SYSTEM

[76] Inventor: Gerard Queveau, Amik Farm, 79140, Le Pin, Cerizay, France

[21] Appl. No.: 436,177

[22] Filed: Oct. 22, 1982

[51] Int. Cl.³ .............................................. B62D 47/02
[52] U.S. Cl. .................................. 180/14.2; 180/307; 280/432
[58] Field of Search ................ 180/14 R, 14 A, 14 D, 180/14 E, 14 B, 242, 243, 307, 245; 280/432

[56] References Cited

U.S. PATENT DOCUMENTS

| | | | |
|---|---|---|---|
| 2,851,115 | 9/1958 | Buckendale | 180/248 |
| 3,227,235 | 1/1966 | Budzich et al. | 180/14 A |
| 3,374,847 | 3/1968 | Budzich | 180/243 |
| 3,532,177 | 10/1970 | Herrmann | 180/143 |
| 3,913,697 | 10/1975 | Greene | 180/14 A |
| 4,180,138 | 12/1979 | Shea | 180/245 |
| 4,320,811 | 3/1982 | Queveau | 180/14 A |
| 4,371,186 | 2/1983 | Queveau et al. | 280/432 |
| 4,405,145 | 9/1983 | Bergman et al. | 280/432 |
| 4,412,592 | 11/1983 | Bergman et al. | 180/14 A |

Primary Examiner—Joseph F. Peters, Jr.
Assistant Examiner—Michael Mar
Attorney, Agent, or Firm—Leydig, Voit, Osann, Mayer & Holt, Ltd.

[57] ABSTRACT

A drive and control system for articulated vehicles which normally operates in an efficient push-mode with only the wheels of the rear section being driven, but which operates in a hybrid mode when the vehicle has a tendency to jackknife wherein a controlled torque is applied to the rear wheels of the forward section. The value of the torque is determined as a predetermined increasing function of the magnitude of the connection force at the articulation connection and the magnitude of the articulation angle. In a preferred embodiment of the invention, the drive shaft to the differential which drives the wheels of the rear section also drives a variable displacement hydraulic pump which feeds fixed displacement hydraulic motors connected by overrunning clutches to the rear wheels of the forward section. Thus the average displacement of the hydraulic pump is constant and the torque applied to the middle wheels of the rear section is proportional to the hydraulic pressure, which may be adjusted by temporarily increasing or decreasing the pump displacement. The preferred system may easily be modified to compensate for loss of rear tire traction and to accommodate an hydraulic accumulator for energy storage and dynamic braking.

15 Claims, 6 Drawing Figures

ARTICULATED VEHICLE DRIVE AND CONTROL SYSTEM

The present invention relates to drive and control systems for articulated vehicles. U.S. Pat. No. 4,320,811, incorporated herein by reference, discloses drive and control systems for articulated vehicles having a rear trailer section with a single set of wheels and a forward section with one set of steering and one set of non-steering wheels, the two sections being pivotally connected at an articulation connection. The drive and control systems disclosed in the referenced patent offer advantages of having an engine located at the rear of the trailer section driving only the rear wheels except under certain circumstances, e.g., when a possibility of jackknifing exists or when rear wheel traction is lost. In such situations the middle wheels, i.e., the non-steering wheels of the forward section, become driving to supplement the driving by the rear wheels, yielding what might be termed a hybrid rear wheel/middle wheel drive system. In a preferred embodiment the drive and control system of the referenced patent utilizes a specially adapted articulation connection to sense the magnitude and direction of the instantaneous force $F_C$ transmitted at the pivot point between the forward and trailer sections. The articulation connection itself is the subject of co-pending U.S. Ser. No. 223,144 filed Jan. 7, 1982, now U.S. Pat. No. 4,371,186. According to the teachings of the referenced patent, the force sensed at the articulation connection may be used in connection with a drive system rule to determine when and to what extent power should be applied to the middle wheels. The present invention is a further advantageous variation of the basic type of hybrid drive and control system disclosed in the referenced patent.

In particular, the primary object of the present invention is to substantially simplify the drive components and the control system for an articulated vehicle wherein power is selectivity applied to the middle wheels of the vehicle.

Another object of the instant invention is to provide a means for tapping off a controlled fraction of the total drive power from the conventional drive train of an articulated vehicle for application of power to the middle wheels without noticeably altering the vehicle engine performance or driving characteristics.

Yet another object is to provide a simplified control system for selectively applying torque to the middle wheels of an articulated vehicle that is responsive to slippage of the rear tires on the road surface as well as being responsive to the connection force at the articulation point.

Still another object is to include dynamic braking and energy storage features in a simplified system of control and drive components for an articulated vehicle and thereby improve dynamic performance characteristics.

Other objects and advantages of the present invention will become apparent upon reading the following detailed description and upon reference to the drawings in which.

Figure 1:
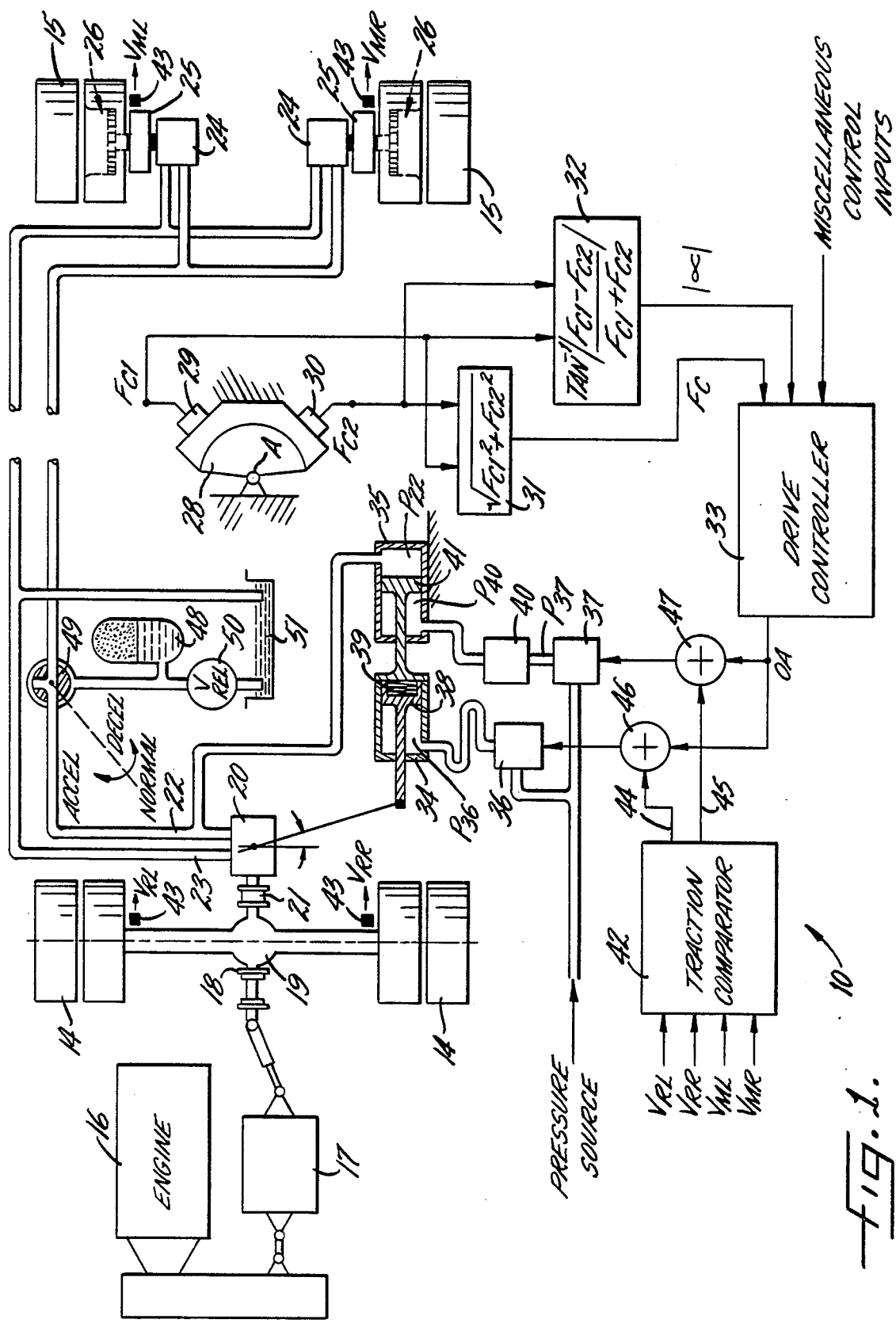
FIG. 1 is a schematic of an articulated bus drive and control system of the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications equivalents and alternatives falling within the spirit and scope of the invention as defined by the appended claims.

Figure 2:
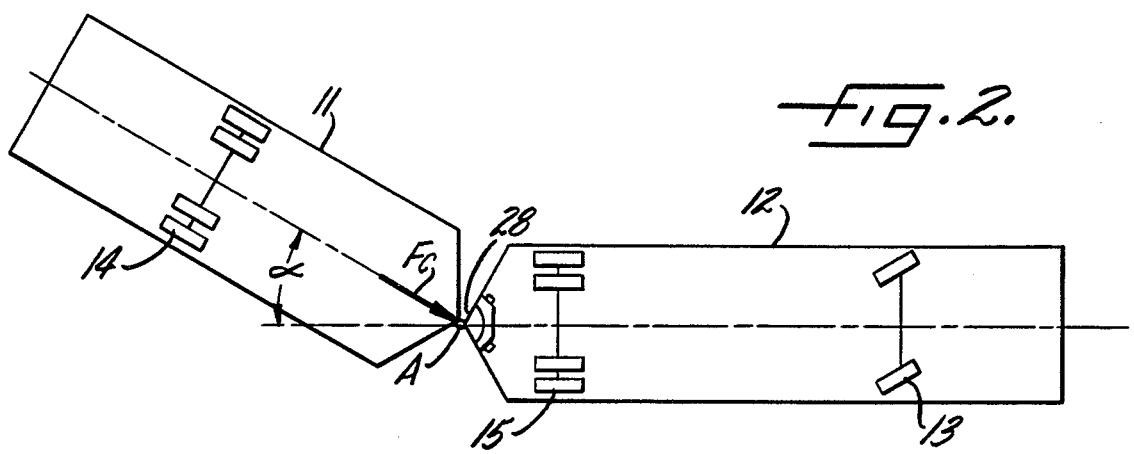
FIG. 2 is a schematic of an articulated bus of the type which may be driven and controlled with the system of FIG. 1.

Turning now to the drawings, FIG. 1 illustrates in schematic form a drive and control system generally designated 10 for an articulated vehicle of the general type depicted in FIG. 2. Such a vehicle has a rear trailer section 11 pivotally connected at point A to a forward steering section 12. Steering of the vehicle is effected by non-driven wheels 13 on the forward section 12. The drive and control system 10 according to the invention can operate the vehicle in either a rear-wheel-drive-only mode in which the rear wheels 14 on the trailer section 11 are the only ones driven, or with power being applied to both the rear wheels and to the middle set of wheels 15 on the forward section 12.

In the embodiment shown, the rear wheels 14 are shown to be mechanically driven via an engine 16, gearbox 17 and differential/rear axle sub-assembly 19 having a drive shaft 18.

According to the present invention, provision is made to selectively apply a fraction of the total driving power to the middle wheels 15. This is accomplished in the embodiment shown with a variable displacement hydraulic pump 20 mounted to the differential 19, with a clutch 21 interconnecting the rear axle drive shaft 18 to the pump rotor. The pump 20 is connected via hydraulic lines 22 and 23 to two hydraulic motors 24, each associated with one of the middle wheels 15. According to an aspect of the present invention which allows for simplification of the entire system, the hydraulic motors 24 are drivingly connected to the respective wheels 15 through overrunning clutches 25. Depending upon the operating characteristics of the motors, speed reducing gears 26 may also be interposed between the motors and the wheels. The clutches 25 enable the motors to selectively drive the middle wheels 15 forward or allow the wheels to "free-wheel", depending upon whether the control system described below is calling for the application of forward driving power to the wheels.

With the arrangement described above, the pump 20 effectively taps driving power from the rear wheels 14 and applies it to the middle wheels 15. As discussed in detail in U.S. Pat. No. 4,320,811, such a selective splitting up of the total power according to a predetermined drive system rule can permit both stable and efficient operation of articulated vehicles.

In the present embodiment the power applied to the middle wheels 15 is, according to the basic engineering principles involved, a function of the total flow of hydraulic fluid and the pressure differential across the motor (i.e., the pressure differential between lines 22 and 23). In terms of driving force exerted by the middle wheels 15 on the road surface, such force is a function of the torque generated by the hydraulic motors, which in turn is a function of the displacement of the motors and the pressure differential across the motors. The embodiment shown utilizes these relationships to provide a particularly advantageous scheme of regulation. By using fixed displacement motors 24 and maintaining the pressure in the return line 23 at a known level, e.g., at or near atmospheric, the torque applied to the wheels 15 is made a direct function of the pressure in feed line 22. The use of fixed displacement motors 24 in conjunction with the overrunning clutches 25 offers another significant advantage, namely, it renders the input flow to the motors necessary to cause them to become driving directly proportional to the vehicle speed.

In the embodiment shown in FIG. 1, since the pump 20 is mounted to the differential 19 and driven coincident with rotation of the drive shaft 18, its output flow is also directly proportional to the speed of the vehicle. With this arrangement, according to the principles and relationships discussed above, the pressure in the feed line 22 may be controlled through adjusting the displacement of the pump 20. Note that in practice the pump displacement is independent of the speed of the vehicle since the average pump displacement is constant as the pressure in the feed line 22 is regulated. The average displacement is, of course, the displacement required to supply the fixed displacement of the motors 24. The displacement of the pump 20 temporarily increases or decreases from the constant average in order to raise or lower, respectively, the pressure in the feed line 22. This is a result of the fact that the pressure in the feed line 22 is the time integral of the net flow of hydraulic fluid into the feed line 22. Thus the use of a variable displacement pump geared (at a fixed gear ratio) to the rear wheels and driving fixed displacement motors geared to the middle wheels leads to a control system that is particularly insensitive to variations in the speed of the vehicle.

Driving the hydraulic pump 20 in synchronism with the differential drive shaft 18 and thus the rear wheels 14 rather than in synchronism with the engine 16 drive shaft enhances dynamic stability without noticeably altering the vehicle engine performance or driving characteristics. Consider the case of loss of rear wheel traction when the middle wheels are being driven by the hydralic pump 20. Coincident with the loss of traction, the velocity of the pump 20 increases, causing a net flow of hydraulic fluid into the feed line 22 and hence a nearly instantaneous increase in hydraulic pressure. Thus the load that was on the rear wheels 14 is shifted to the middle wheels 15 without an appreciable increase in the speed of the engine 16. Drive power is transferred from the rear wheels to the middle wheels almost instantaneously, so that the spin of the rear wheels is limited and traction consequently regained, while the middle wheels drive the vehicle and maintain a straight path.

Consider also the effect of intermittent surges or loss of power from the engine 16. The drive to the pump 20 is unaffected by engine speed variations coincident with the shifting of gears in the transmission 17 since the pump 20 is geared to the rear wheels.

Figure 3A:
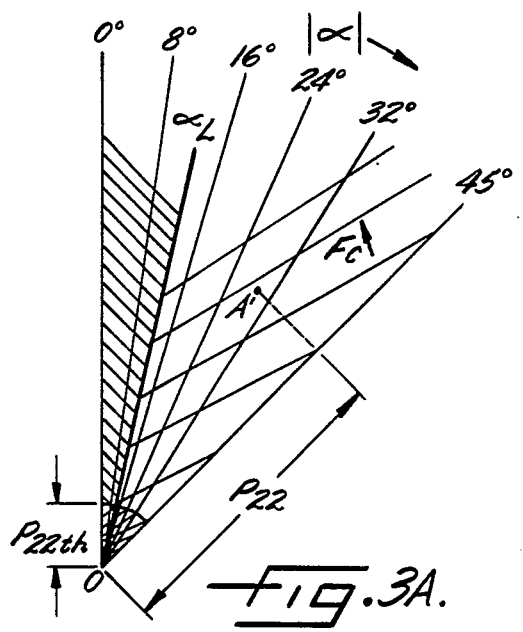
FIGS. 3A and 3B are graphs of a representative control function or drive rule used by the drive controller in the system of FIG. 1.
Figure 3B:
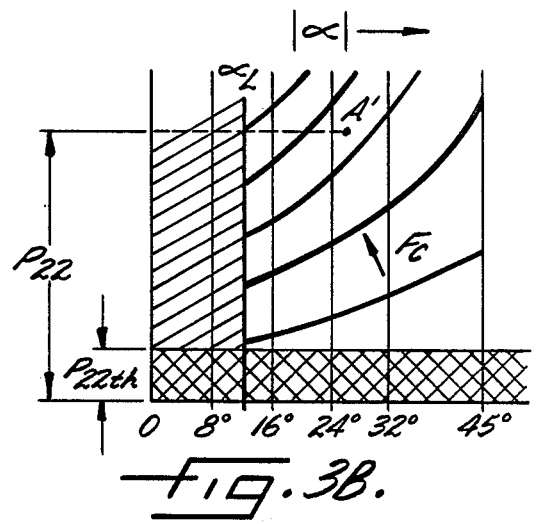

According to a further aspect of the present invention, there is provided a control circuit which selects the level of torque and power applied to the middle wheels by monitoring parameters indicating the tendency of the vehicle to jackknife and determining the approximate level of torque sufficient to prevent jackknifing. Specifically, the control circuit adjusts the displacement of the pump 20 so that the pressure in the feed line 22 is an increasing function of the instantaneous connection force $F_C$ and the magnitude of the articulation angle $\alpha$. FIGS. 3A and 3B are representative graphs of a control function or drive rule used by the control circuit shown in FIG. 1 as described above. The independent variable $/\alpha/$ is the magnitude of the articulation angle $\alpha$ (FIG. 2) of the connection 28, the range of $\alpha$ being about $\pm 45°$ with a total stop-to-stop range of 90°. FIG. 3A is in polar form while FIG. 3B is in rectangular form, the same control function being depicted in each. In FIG. 3A, the arcuate lines are lines of constant connection force $F_C$. The point of intersection of the line connesponding to the magnitude of the instantaneous articulation angle $\alpha$ with the line corresponding to the instantaneous connection force $F_C$, e.g., point A', specifies a particular operating condition or state of the articulated vehicle. The distance between the vertex 0 and the operating point A' specifies the appropriate pressure $P_{22}$ in the hydraulic feed line 22. In other words, the arcuate lines in FIGS. 3A and 3B represent a plurality of graphs of the desired pressure $P_{22}$ as a function of $/\alpha/$ for a few discrete values of $F_C$. Preferably, the desired pressure $P_{22}$ is a sharply increasing function of the articulation angle as the magnitude of the angle approaches 45°.

By way of further explanation, in FIGS. 3A and 3B the line $\alpha_1$ (about 12°) bounds a shaded region over which jackknifing is unlikely to occur, such that power need not be applied to middle wheels 15. Hence, the lines of constant $F_C$ are not shown extending into the shaded zone. For example, referring to the discussion of FIGS. 4–6 in U.S. Pat. No. 4,320,811, for a specific theoretical bus operating under the worst conditions, i.e., without a passenger load, jackknifing was not the controlling risk for articulation angles $\alpha$ under about 24°. Accordingly, for that particular hypothetical bus, the $\alpha_1$ lines could be located at about 24°. In that specific case, as long as the articulation angle is less than about 24°, the hydraulic system for driving the middle wheels 15 would be inactive. Moreover, as further described below, the hydraulic system may be designed to remain inactive unless the desired hydraulic pressure $P_{22}$, calculated as an increasing function of $F_C$ and $/\alpha/$, exceeds a predetermined low threshold, regardless of the articulation angle. This threshold is shown as $P_{22th}$ in FIGS. 3A and 3B, with the area below this value shown cross-hatched in the figures.

When the middle wheels are inactive the articulated vehicle is propelled in the most efficient manner solely by the conventional mechanical drive to the rear wheels. For articulation angles about $\alpha_1$, depending upon the instantaneous values for $F_C$ and $\alpha$, the hydraulic drive to the middle wheels may also be used, with the torque and power applied to the middle wheels increasing sharply at high articulation angles. Preferably the torque applied to the middle wheels is somewhat greater than the minimum such torque required to prevent jackknifing, as determined by the control function or design rule.

From the above discussion it will be appreciated that the principle of operation according to the present invention is not dependent upon the use of the specific function depicted in FIGS. 3A and 3B. Indeed, from the discussion in U.S. Pat. No. 4,320,811 in connection with FIGS. 4–6 therein, it will be apparent that the tendency to jackknife even for a given bus is dependent upon several factors, in addition to the instantaneous value of the $F_C$ and $\alpha$, including the instantaneous passenger load of the bus, the instantaneous road conditions, etc. According to the present invention the fundamental principle of operation, as described above, is that, given such parameters as the articulation angle $\alpha$, the connection force $F_C$, and perhaps other miscellaneous variables, a signal is generated to control relative power applied to the middle wheels. In particular, a control signal is generated to specify the torque applied to the middle wheels. By generating the control signal in real time, it can be continuously updated in response to changing conditions, e.g. articulation angle, acceleration, deceleration, etc., in an effort to maintain the optimum operating condition.

Turning again to the exemplary embodiment shown in FIG. 1, the instantaneous connection force $F_C$ and articulation angle $\alpha$ are first derived from the outputs $F_{C1}$ and $F_{C2}$ of transducers 29 and 30 at the articulation connection 28 by means of calculators 31 and 32, respectively. These derived values $F_C$, /$\alpha$/ are then used by a drive controller 33 to determine, in accordance with a control function or drive rule of the type shown in FIGS. 3A and 3B above, an analog, i.e., variable amplitude, signal OA to control the pressure in the feed line 22. This is accomplished by setting the displacement of the pump 20 such that it generates a pressure in line 22 which, according to the control function or drive rule, is called for by the instantaneous connection force $F_C$ and articulation angle $\alpha$. The feed line 22 sets the pressure differential across the fixed displacement motors 24 so that the signal OA specifies the torque applied to the middle wheels. While the specific hardware can vary without departing from the spirit of the invention, the drawings show one advantageous embodiment.

This embodiment operates in a two-step manner. Under operating conditions which clearly do not call for the application of power to the middle wheels 15, i.e., when the articulation angle is less than $\alpha_1$ or when $F_C$ is below a certain predetermined limit where jackknifing is unlikely, the displacement of the pump 20 is maintained near zero. This avoids unnecessary circulation of the hydraulic fluid and any power losses associated therewith. Once a minimum predetermined pressure is called for, however, an activating cylinder 34 adjusts the pump displacement to a predetermined level which approximates that required to make the motors 24 become driving. As already discussed above, when the middle wheels are driven the mean or average pump displacement is constant for all vehicle speeds, so the cylinder 34 can be preset to effect approximately this mean or average pump displacement.

Once the pump displacement is set to approximately the level required to render the middle wheels 15 driving, a second, balancing cylinder 35 "fine tunes" the displacement to achieve the desired pressure level and, accordingly, to generate the desired torque and power at the middle wheels.

Figure 4A:
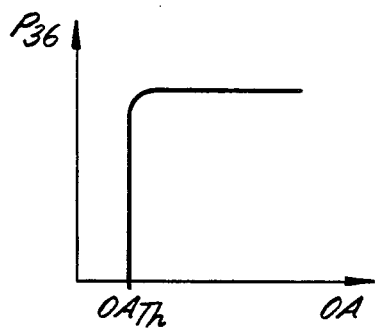
FIGS. 4A and 4B illustrate the response of pressure controller used in the drive and control system of FIG. 1.
Figure 4B:
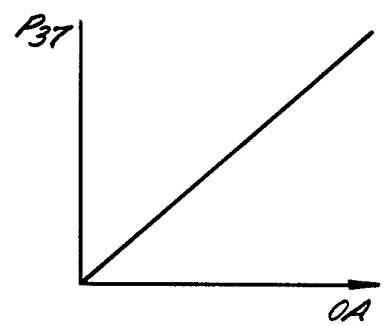

In the embodiment shown, the analog signal OA controls the operation of two pneumatic pressure controllers 36 and 37. As depicted in FIG. 4A, if the signal OA is above a fairly low threshhold $OA_{Th}$, the output $P_{36}$ of the pressure controller 36 will drive the piston 38 fully to the right within cylinder 34 against the force of a return spring 39, causing the displacement of the pump 20 to increase from its normal, near zero level to substantially the combined displacement of the hydraulic motors 24. Hence the output $P_{36}$ is essentially a digital, i.e. on-off, one which effects an initial, approximate setting of the pump displacement. Alternatively, the pneumatic pressure controller 36 could be activated by a separate control signal from the drive controller 33 generated as a function of the articulation angle $\alpha$, or a combination of the articulation angle $\alpha$ and the connection force $F_C$.

The output OA also controls the output $P_{37}$ of the pneumatic controller 37, with the later varying in magnitude with the former. See, e.g., the relationship depicted in FIG. 4B. In the embodiment shown the variable output $P_{37}$ of the pneumatic controller 37 is converted to hydraulic pressure via an amplifier 40. The hydraulic pressure output $P_{40}$ of the amplifier 40 is fed to one side of the piston 41 within the balancing cylinder 35. The hydraulic pressure $P_{22}$ from the feed line 22 is fed to the other side of the balancing piston 41. The housing of the balancing cylinder 35 is fixed to the vehicle frame. The rod of the balancing piston 41 is connected to the housing of the activating cylinder 34 such that a movement of the balancing piston 41 translates the entire actuating cylinder 34 and effects an adjustment in the displacement of the pump 20. In the event the pressure $P_{22}$ within the feed line 22 is less than the control pressure $P_{40}$, the balancing piston 41 will be forced to the right, increasing the displacement of the pump 20 and, accordingly, increasing the pressure $P_{22}$ in line 22. The displacement of the pump 20 will continue to increase until the pressure in line 22 is sufficient to arrest the shifting of the balancing piston 41 to the right. Conversely, if the pressure $P_{22}$ exceeds the control pressure $P_{40}$, the balancing piston 41 will shift to the left, causing a decrease in the pump displacement and, consequently, a decrease in the pressure $P_{22}$. In this manner, as discussed above, the output OA serves to control the pressure $P_{22}$ in the feed line 22 and, consequently, the torque applied to the middle wheels 15.

In accordance with an optional feature of the present invention, the above-described control system further comprises means for sensing slippage of the rear wheels on the road surface and consequent loss of traction. As shown in FIG. 1, a traction comparator 42 receives velocity signals $V_{RL}$, $V_{RR}$, $V_{ML}$, $V_{MR}$ from tachometers 43 sensing rotation of the respective rear and middle wheels. If the velocity signals differ significantly, the traction comparator 42 turns on the drive to the middle wheels via a control signal on an output line 44 and commands a desired torque or torque increase sufficient to compensate for the wheel slippage via a second output line 45. The traction comparator 42 output signals on lines 44 and 45 are combined with the drive controller 33 output signal OA at summing nodes 46 and 47, respectively. If the pneumatic pressure controllers 36, 37 are the conventional current-controlled type, the summing nodes need only be control line junctions, as will be apparent to persons skilled in the art. Alternatively, if the drive controller 33 accepts the velocity signals $V_{RL}$, $V_{RR}$, $V_{ML}$, $V_{MR}$ as miscellaneous control inputs, the traction comparator 42 may be implemented as part of the drive controller 33. The calculators 31, 32, drive controller 33, and traction comparator 42, for example, may be embodied in a single microprocessor under stored program control.

In accordance with still another optional feature of the present invention, an hydraulic accumulator 48 (FIG. 1) stores energy for improving vehicle dynamics such as acceleration. To provide a temporary surge of power, a three-way valve 49 is turned to connect the hydraulic motors 24 to the accumulator 48, the accumulator 48 having been charged to a high pressure. The accumulator 48 may be charged by turning the three-way valve for connection of the pump 20 to the accumulator 48 rather than to the motors 24. The charging rate is a function of the pump 20 displacement and the charging pressure may be controlled by a suitable control signal to the pneumatic pressure controllers 36, 40 as will be apparent to persons skilled in the art. Preferably the accumulator is charged during deceleration of the vehicle to provide a dynamic braking feature and to conserve energy. In the event that the accumulator is fully charged, vehicle braking is still provided as the flow of high pressure hydraulic fluid from the pump 20 is shunted through a pressure relief valve 50 to a sump 51. The dynamic braking feature should be coordinated with the drive controller, for example, by embodying the dynamic braking system and the drive controller in a single microprocessor under stored program control, and by including the desired rate of deceleration, pump displacement and accumulator pressure as miscellaneous control inputs, as will be apparent to persons skilled in the art.

In view of the above, a mechanically simple and reliable drive control for an articulated vehicle has been described wherein power is selectively applied to the middle wheels of the vehicle. The drive control system taps off a controlled fraction of the total drive power from the conventional drive train of an articulated vehicle without noticeably altering the vehicle's engine performance or driving characteristics. In particular, the mechanical components of the drive system accept a control signal specifying the torque to be applied to the middle wheels. The drive controller operates the control signal from a control function or drive rule which determines the amount of torque to be applied to the middle wheels to prevent jackknifing. As an optional feature, the control system may include means to detect and compensate for loss of traction. Moreover, an optional accumulator may provide energy storage and dynamic braking to improve vehicle performance and to conserve energy.

What is claimed is:

1. A method of propelling an articulated vehicle having a forward section and a rear section connected at an articulation connection, the vehicle having a source of driving power, the rear section having a first set of wheels driven through a differential by the source of driving power, the differential having a variable displacement hydraulic pump mounted thereon, the forward section having a second set of wheels for steering the vehicle and a third set of wheels, each wheel in the third set of wheels being selectively drivable through a respective overrunning clutch by a respective fixed displacement hydraulic motor, the hydraulic motors being connected by hydraulic lines to the hydraulic pump, the articulation connection transmitting a connection force between the forward and rear sections, the method comprising:

monitoring parameters with at least one transducer having an output from which values for the instantaneous angle of articulation between the sections and the magnitude of the connection force may be derived;

determining a torque control signal as a predetermined increasing function of the magnitude of the instantaneous angle of articulation and magnitude of the connection force, and using the torque control signal to achieve a predetermined differential pressure across the hydraulic motors by adjusting the hydraulic pump displacement, whereby the torque applied to the third set of wheels is an increasing function of the magnitude of the instantaneous angle of articulation and magnitude of the connection force, whereby independent of the speed of the vehicle, when the first set of wheels slip, tending to cause a jackknifing situation, the hydraulic pump increases its flow of hydraulic fluid to the motors, thereby increasing the speed of the hydraulic motors relative to the speed of the third set of wheels, whereupon the overrunning clutches are engaged and the third set of wheels are driven to prevent the jackknifing situation.

2. A method of propelling an articulated vehicle having a forward section and a rear section connected at an articulation connection, the vehicle having a source of driving power, the rear section having a first set of wheels driven through a differential by the source of driving power, the differential having a variable displacement hydraulic pump mounted thereon, the forward section having a second set of wheels for steering the vehicle and a third set of wheels, the third set of wheels being selectively drivable through overrunning clutches by hydraulic motors connected by hydraulic lines to the hydraulic pump, the articulation connection transmitting a connection force between the forward and rear sections, the method comprising:

monitoring parameters with at least one transducer having an output from which values for the instantaneous angle of articulation between the sections and the magnitude of the connection force may be derived;

determining a torque control signal as a predetermined increasing function of the magnitude of the instantaneous angle of articulation and magnitude of the connection force;

using the torque control signal to achieve a predetermined differential pressure across the hydraulic motors by adjusting the hydraulic pump displacement, whereby the torque applied to the third set of wheels is an increasing function of the magnitude of the instantaneous angle of articulation and magnitude of the connection force, and further comprising the step of comparing the torque control signal to at least one predetermined threshold and maintaining the hydraulic pump displacement near zero when the torque control signal is less than the predetermined threshold, so that the third set of wheels is not driven unless the threshold is exceeded.

3. The method as claimed in claim 2, wherein the increasing function of the magnitude of the instantaneous angle of articulation and magnitude of the connection force is generally proportional to the magnitude of the connection force and is also a sharply increasing function of the magnitude of the articulation angle as the articulation angle approaches 45°.

4. A method of propelling an articulated vehicle having a forward section and a rear section connected at an articulation connection, the vehicle having a source of driving power, the rear section having a first set of wheels driven through a differential by the source of driving power, the differential having a variable displacement hydraulic pump mounted thereon, the forward section having a second set of wheels for steering the vehicle and a third set of wheels, the third set of wheels being selectively drivable through overrunning clutches by hydraulic motors connected by hydraulic lines to the hydraulic pump, the articulation connection transmitting a connection force between the forward and rear sections, the method comprising:

monitoring parameters with at least one transducer having an output from which values for the instantaneous angle of articulation between the sections and the magnitude of the connection force by be derived;

determining a torque control signal as a predetermined increasing function of the magnitude of the instantaneous angle of articulation and magnitude of the connection force, and using the torque control signal to achieve a predetermined differential pressure across the hydraulic motors by adjusting the hydraulic pump displacement, whereby the torque applied to the third set of wheels is an increasing function of the magnitude of the instantaneous angle of articulation and magnitude of the connection force, wherein the increasing function of the magnitude of the instantaneous angle of articulation and magnitude of the connection force is generally proportional to the magnitude of the connection force and is also a sharply increasing function of the magnitude of the articulation angle as the articulation angle approaches 45°.

5. In an articulated vehicle having a forward and a rear section connected at an articulation connection, and a source of driving power, the rear section having a first set of wheels driven through a differential by the source of driving power, the forward section having a second set of wheels for steering and a third set of non-steering wheels, the improvement comprising:

a variable displacement hydraulic pump mounted on the differential;

each wheel in the third set of wheels having a respective fixed displacement hydraulic motor connected to the wheel via a respective overrunning clutch, the hydraulic motors being connected by hydraulic lines to the hydraulic pump for selectively driving the third set of wheels;

means for monitoring parameters having at least one output from which the tendency of the vehicle to jackknife may be derived;

means for determining from the value indicating the tendency of the vehicle to jackknife, a value of torque to apply to the third set of wheels which is sufficient to prevent jackknifing of the vehicle; and means for controlling the torque applied at the third set of wheels by the hydraulic motors through adjusting the displacement of the hydraulic pump in response to the determined value of torque, whereby independent of the speed of the vehicle, when the first set of wheels slip, tending to cause a jackknifing situation, the hydraulic pump increases its flow of hydraulic fluid to the motors, thereby increasing the speed of the hydraulic motors relative to the speed of the third set of wheels, whereupon the overrunning clutches are engaged and the third set of wheels are driven to prevent the jackknifing situation.

6. The vehicle as claimed in claim 5, further comprising means for determining the magnitude of the articulation angle between the forward and rear sections of the vehicle at the articulation connection, and wherein the determined torque is an increasing function of the magnitude of the articulation angle.

7. The combination as claimed in claim 5, further comprising means for sensing the rotational velocity of at least two of the wheels, means for comparing the sensed rotational velocities, and wherein the means for determining further comprises means for increasing the torque to the third set of wheels in response to the comparison if there is a substantial difference in wheel rotational velocities, so that the torque applied to the third set of wheels is increased in response to loss of traction.

8. In an articulated vehicle having a forward and a rear section connected at an articulation connection, and a source of driving power, the rear section having a first set of wheels driven through a differential by the source of driving power, the forward section having a second set of wheels for steering and a third set of non-steering wheels, the improvement comprising:

a variable displacement hydraulic pump mounted on the differential;

hydraulic motors connected by hydraulic lines to the hydraulic pump for selectively driving the third set of wheels through overrunning clutches;

means for monitoring parameters having at least one output from which the tendency of the vehicle to jackknife may be derived;

means for determining, from the value indicating the tendency of the vehicle to jackknife, a value of torque to apply to the third set of wheels which is sufficient to prevent jackknifing of the vehicle;

means for controlling the torque applied at the third set of wheels by the hydraulic motors through adjusting the displacement of the hydraulic pump in response to the determined value of torque;

means for generating a pressure control signal generally proportional to the determined value of torque;

means for comparing the hydraulic pressure generated by the pump to the value of the pressure control signal;

means for decreasing the pump displacement if the hydraulic pressure exceeds the value of the pressure control signal, and increasing the pump displacement if the hydraulic pressure falls below the value of the pressure control signal, so that the pressure control signal regulates the hydraulic pressure and is thus a torque control signal;

means responsive to the absence of an activating signal for setting the displacement of the pump to approximately zero; and means for generating the activating signal when the pressure control signal exceeds a predetermined pressure, the pump displacement thereafter being responsive to the pressure control signal.

9. The vehicle as claimed in claim 8 wherein the means for comparing the hydraulic pressure comprises a double acting cylinder with one chamber receiving the pressurized hydraulic fluid and the other chamber receiving hydraulic fluid at a reference pressure, and further comprises a hydraulic amplifier accepting the pressure control signal and generating the reference hydraulic pressure in response to the pressure control signal.

10. The combination as claimed in claim 8, further comprising means for sensing the rotational velocity of at least two of the wheels, means for comparing the sensed rotational velocities, and wherein the means for determining further comprises means for increasing the torque to the third set of wheels in response to the comparison if there is a substantial difference in wheel rotational velocities, so that the torque applied to the third set of wheels is increased in response to loss of traction.

11. The combination as claimed in claim 8, further comprising an hydraulic accumulator and means for selectively connecting the hydraulic accumulator to the pressurized hydraulic line to charge and discharge the accumulator and means for shutting off the flow of hydraulic fluid to the hydraulic motors when the accumulator is being charged.

12. In an articulated vehicle having a forward and a rear section connected at an articulation connection, and a source of driving power, the rear section having a first set of wheels driven through a differential by the source of driving power, the forward section having a second set of wheels for steering and a third set of non-steering wheels, the improvement comprising:
   a variable displacement hydraulic pump mounted on the differential;
   hydraulic motors connected by hydraulic lines to the hydraulic pump for selectively driving the third set of wheels through overrunning clutches;
   means for monitoring parameters having at least one output from which the tendency of the vehicle to jackknife may be derived;
   means for determining, from the value indicating the tendency of the vehicle to jackknife, a value of torque to apply to the third set of wheels which is sufficient to prevent jackknifing of the vehicle;
   means for controlling the torque applied at the third set of wheels by the hydraulic motors through adjusting the displacement of the hydraulic pump in response to the determined value of torque; and
   an hydraulic accumulator and means for selectively connecting the hydraulic accumulator to the pressurized hydraulic line to charge and discharge the accumulator and means for shutting off the flow of hydraulic fluid to the hydraulic motors when the accumulator is being charged.

13. An hydraulic drive system for a vehicle having at least a first and second pair of wheels, the first pair of said wheels sharing a common axle having a differential, the differential having a drive shaft connected to an engine and transmission, the hydraulic drive system comprising, in combination,
   a variable displacement hydraulic pump, the shaft of the pump being driven at a fixed gear ratio in synchronism with rotation of the drive shaft of the differential,
   a pair of fixed displacement hydraulic motors, each motor associated with a respective wheel of the second pair of said wheels, the motors being driven by said pump,
   a pair of overrunning clutches, each clutch connecting a respective motor of said pair of motors to its associated wheel, and
   pressure control means for comparing the hydraulic pressure generated by the pump to a pressure control signal and increasing the pump displacement if the pressure control signal is greater than the hydraulic pressure, and decreasing the pump displacement if the pressure control signal is less than the hydraulic pressure, so that the average pump displacement is generally independent of the speed of the vehicle and the pressure control signal regulates the torque applied to the second pair of wheels.

14. The drive system as claimed in claim 13, further comprising means responsive to the absence of an activating signal for setting the displacement of the pump to approximately zero and further comprising means for generating the activating signal when the pressure control signal exceeds a predetermined pressure, the pump displacement thereafter being responsive to the pressure control signal.

15. The drive system as claimed in claim 13, wherein the means for comparing the hydraulic pressure comprises a double acting cylinder with one chamber receiving the pressurized hydraulic fluid from the pump and the other chamber receiving hydraulic fluid at a reference pressure, and further comprises an hydraulic amplifier accepting the pressure control signal and generating the reference hydraulic pressure in response to the pressure control signal.

* * * * *